(12) United States Patent
Serpa et al.

(10) Patent No.: US 7,778,052 B2
(45) Date of Patent: Aug. 17, 2010

(54) METHOD FOR OPERATING A CONVERTER CIRCUIT AND APPARATUS FOR IMPLEMENTING THE METHOD

(75) Inventors: Leonardo Serpa, Zürich (CH); Srinivas Ponnaluri, Untersiggenthal (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 12/403,059

(22) Filed: Mar. 12, 2009

(65) Prior Publication Data
US 2009/0237964 A1  Sep. 24, 2009

Related U.S. Application Data

(63) Continuation of application No. PCT/EP2007/059727, filed on Sep. 14, 2007.

(60) Provisional application No. 60/844,675, filed on Sep. 15, 2006.

(51) Int. Cl.
 H02M 1/12 (2006.01)
 H02M 5/42 (2006.01)

(52) U.S. Cl. .................. 363/40; 363/47; 363/87; 363/98

(58) Field of Classification Search ......... 363/39–41, 363/44–48, 87, 98, 129, 132
See application file for complete search history.

(56) References Cited

U.S. PATENT DOCUMENTS

| | | | |
|---|---|---|---|
| 6,545,887 B2 * | 4/2003 | Smedley et al. | 363/89 |
| 7,450,405 B2 * | 11/2008 | Ponnaluri et al. | 363/40 |
| 7,518,893 B2 * | 4/2009 | Ponnaluri et al. | 363/62 |
| 7,542,311 B2 * | 6/2009 | Serpa et al. | 363/40 |
| 2007/0091653 A1 * | 4/2007 | Leggate et al. | 363/41 |
| 2007/0121354 A1 * | 5/2007 | Jones et al. | 363/47 |

FOREIGN PATENT DOCUMENTS

WO   WO 2006/079225 A1   8/2006

OTHER PUBLICATIONS

L.A. Serpa et al., "A Modified Direct Power Control Strategy Allowing the Connection of Three-Phase Inverter to the Grid through LCL Filters", Industry Applications Conference, 2005, Fortieth IAS Annual Meeting, Conference Record of the 2005 Hong Kong, China, Oct. 2-6, 2005, New Jersey, USA, IEEE, Oct. 2, 2005, pp. 565-571.
International Search Report (PCT/ISA/210) dated Nov. 26, 2007.
International Preliminary Report on Patentability (Form PCT/IB/326, Form PCT/IB/373 and Form PCT/ISA/237) issued in PCT/EP2007/059727, Mar. 17, 2009, The International Bureau of WIPO, Geneva, CH; and English-language translation thereof.

* cited by examiner

*Primary Examiner*—Jessica Han
(74) *Attorney, Agent, or Firm*—Buchanan Ingersoll & Rooney PC (57) ABSTRACT

A method is disclosed for the operation of a converter circuit, wherein the converter circuit has a converter unit having a multiplicity of actuatable power semiconductor switches and an LCL filter which is connected to each phase connection of the converter unit, in which the actuatable power semiconductor switches are actuated by means of an actuation signal (S) formed from a hysteresis active power value ($d_P$), from a hysteresis reactive power value ($d_Q$) and from a selected flux sector ($\theta_n$). The hysteresis active power value ($d_P$) is formed from a differential active power value ($P_{diff}$). In addition, the hysteresis reactive power value ($d_Q$) is formed from a differential reactive power value ($Q_{diff}$). An apparatus for carrying out the method is also disclosed.

24 Claims, 4 Drawing Sheets

METHOD FOR OPERATING A CONVERTER CIRCUIT AND APPARATUS FOR IMPLEMENTING THE METHOD

RELATED APPLICATIONS

This application is a continuation application under 35 U.S.C. §120 to of PCT/EP2007/059727 filed as an International Application on Sep. 14, 2007 designating the U.S., which claims the benefit under 35 U.S.C. §119 of U.S. Provisional Patent No. 60/844,675 filed on Sep. 15, 2006, the entire contents of which are hereby incorporated by reference in their entireties.

TECHNICAL FIELD

The disclosure relates to the field of power electronics. It is based on a method for the operation of a converter circuit and on an apparatus for carrying out the method.

BACKGROUND INFORMATION

Known converter circuits comprise a converter unit having a multiplicity of actuatable power semiconductor switches which are connected up in known fashion for the purpose of switching at least two switching voltage levels. Each phase connection of the converter unit has an LCL filter connected to it. The converter unit also has a capacitive energy store connected to it, which is commonly formed by one or more capacitors. For the operation of the converter circuit, an apparatus is provided which has a control device for producing a hysteresis active power value, a hysteresis reactive power value and a selected flux sector which is connected to the actuatable power semiconductor switches via an actuation circuit for forming an actuation signal from the hysteresis active power value, the hysteresis reactive power value and the selected flux sector. The actuation signal is therefore used to actuate the power semiconductor switches.

Figure 3:
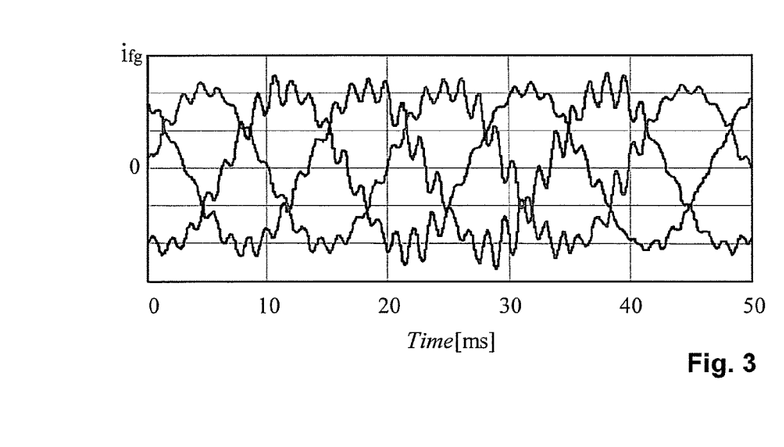
FIG. 3 shows a common time profile for the filter output currents.

A problem of a converter circuit as mentioned above is that the LCL filters can cause permanent distortion, i.e. undesirable oscillations, in the filter output currents and filter output voltages on account of resonant oscillations in the LCL filters, as shown in a common time profile for filter output currents in FIG. 3. In an electrical AC voltage system, which is typically connected to the filter outputs, or when an electrical load is connected to the filter outputs, such distortions can result in damage or even destruction and are therefore highly undesirable.

SUMMARY

Exemplary embodiments disclosed herein are directed to a method for the operation of a converter circuit which can be used to actively damp distortions caused by LCL filters connected to the converter circuit in the filter output currents and filter output voltages. Additional exemplary embodiments disclosed herein are directed to an apparatus which can be used to carry out the method particularly easily . . . .

A method for the operation of a converter circuit is disclosed, wherein the converter circuit has a converter unit having a multiplicity of actuatable power semiconductor switches and an LCL filter which is connected to each phase connection of the converter unit, in which the actuatable power semiconductor switches are actuated by means of an actuation signal (S) formed from a hysteresis active power value ($d_P$), from a hysteresis reactive power value ($d_Q$) and from a selected flux sector ($\theta_n$), wherein the hysteresis active power value ($d_P$) is formed from a differential active power value ($P_{diff}$) by means of a first hysteresis controller, wherein the differential active power value ($P_{diff}$) is formed from the subtraction of an estimated active power value (P) and a damping active power value ($P_d$) from a reference active power value ($P_{ref}$), wherein the damping active power value ($P_d$) is formed from a multiplication, divided by an adjustable damping factor ($k_d$), of a low-pass-filtered d-component of the Park-Clarke transformation of filter capacitance voltages ($u_{TCf,d}$) by a d-component of the Park-Clarke transformation of filter capacitance voltages ($u_{GCf,d}$) which has been filtered in respect of the fundamental of the filter output currents ($i_{fg1}$, $i_{fg2}$, $i_{fg3}$), wherein the hysteresis reactive power value ($d_Q$) is formed from a differential reactive power value ($Q_{diff}$) by means of a second hysteresis controller, wherein the differential reactive power value ($Q_{diff}$) is formed from the subtraction of an estimated reactive power value (Q) and a damping reactive power value ($Q_d$) from a reference reactive power value ($Q_{ref}$), wherein the damping reactive power value ($Q_d$) is formed from a negative multiplication, divided by the adjustable damping factor ($k_d$), of a low-pass-filtered d-component of the Park-Clarke transformation of filter capacitance voltages ($u_{TCf,d}$) by a q-component of the Park-Clarke transformation of filter capacitance voltages ($u_{GCf,q}$) which has been filtered in respect of the fundamental of the filter output currents ($i_{fg1}$, $i_{fg2}$, $i_{fg3}$).

An apparatus for carrying out a method for the operation of a converter circuit is disclosed, wherein the converter circuit has a converter unit having a multiplicity of actuatable power semiconductor switches and an LCL filter which is connected to each phase connection of the converter unit, having a control device which is used to produce a hysteresis active power value ($d_P$), a hysteresis reactive power value ($d_Q$) and a selected flux sector ($\theta_n$) and which is connected to the actuatable power semiconductor switches via an actuation circuit for forming an actuation signal (S), wherein the control device comprises: a first computation unit for forming the hysteresis active power value ($d_P$), the hysteresis reactive power value ($d_Q$) and the selected flux sector ($\theta_n$), wherein the first computation unit has a first hysteresis controller for forming the hysteresis active power value ($d_P$) from a differential active power value ($P_{diff}$), a second hysteresis controller for forming the hysteresis reactive power value ($d_Q$) from a differential reactive power value ($Q_{diff}$) and a vector allocator for forming the selected flux sector ($\theta_n$), a first summator for forming the differential active power value ($P_{diff}$) from the subtraction of an estimated active power value (P) and a damping active power value ($P_d$) from a reference active power value ($P_{ref}$), a second summator for forming the differential reactive power value ($Q_{diff}$) from the subtraction of an estimated reactive power value (Q) and a damping reactive power value ($Q_d$) from a reference reactive power value ($Q_{ref}$), a second computation unit for forming the damping active power value ($P_d$) and the damping reactive power value ($Q_d$), wherein the damping active power value ($P_d$) is formed from a multiplication, divided by an adjustable damping factor ($k_d$), of a low-pass-filtered d-component of the Park-Clarke transformation of filter capacitance voltages ($u_{TCf,d}$) by a d-component of the Park-Clarke transformation of filter capacitance voltages ($u_{GCf,d}$) which has been filtered in respect of the fundamental of the filter output currents ($i_{fg1}$, $i_{fg2}$, $i_{fg3}$), and the damping reactive power value ($Q_d$) is formed from a negative multiplication, divided by the adjustable damping factor ($k_d$), of a low-pass-filtered d-component of the Park-Clarke transformation of filter capacitance voltages ($u_{TCf,d}$) by a q-component of the Park-Clarke transformation of filter capacitance voltages ($u_{GCf,q}$) which has been filtered in respect of the fundamental of the filter output currents ($i_{fg1}$, $i_{fg2}$, $i_{fg3}$).

DETAILED DESCRIPTION

An exemplary converter circuit has a converter unit having a multiplicity of actuatable power semiconductor switches and an LCL filter which is connected to each phase connection of the converter unit. In an exemplary method for the operation of the converter circuit, the actuatable power semiconductor switches are now actuated by means of an actuation signal formed from a hysteresis active power value, from a hysteresis reactive power value and from a selected flux sector. In line with the disclosure, the hysteresis active power value is formed from a differential active power value by means of a first hysteresis controller, and the differential active power value is formed from the subtraction of an estimated active power value and a damping active power value from a reference active power value, wherein the damping active power value is formed from a multiplication, divided by an adjustable damping factor, of a low-pass-filtered d-component of the Park-Clarke transformation of filter capacitance voltages by a d-component of the Park-Clarke transformation of filter capacitance voltages which has been filtered in respect of the fundamental of the filter output currents. In addition, the hysteresis reactive power value is formed from a differential reactive power value by means of a second hysteresis controller, and the differential reactive power value is formed from the subtraction of an estimated reactive power value and a damping reactive power value from a reference reactive power value, wherein the damping reactive power value is formed from a negative multiplication, divided by the adjustable damping factor, of a low-pass-filtered d-component of the Park-Clarke transformation of filter capacitance voltages by a q-component of the Park-Clarke transformation of filter capacitance voltages which has been filtered in respect of the fundamental of the filter output currents.

The damping active power value and the damping reactive power value can provide active damping for distortions, i.e. undesirable oscillations, in the filter output currents and filter output voltages, which means that these distortions are greatly reduced and at best are largely suppressed. A further advantage of the method according to the disclosure is that it is not necessary to connect a discrete, space-taking, complex and hence expensive damping resistor to the respective phase connection in order to be able to effectively damp the undesirable distortions.

An exemplary embodiment of the apparatus for carrying out the disclosed method for the operation of the converter circuit has a control device which is used to produce a hysteresis active power value, a hysteresis reactive power value and a selected flux sector and which is connected to the actuatable power semiconductor switches via an actuation circuit for forming an actuation signal. In line with the disclosure, the control device comprises a first computation unit for forming the hysteresis active power value, the hysteresis reactive power value and the selected flux sector, wherein the first computation unit has a first hysteresis controller for forming the hysteresis active power value from a differential active power value, a second hysteresis controller for forming the hysteresis reactive power value from a differential reactive power value and a vector allocator for forming the selected flux sector. In addition, the control device comprises a first summator for forming the differential active power value from the subtraction of an estimated active power value and a damping active power value from a reference active power value and a second summator for forming the differential reactive power value from subtraction of an estimated reactive power value and a damping reactive power value from a reference reactive power value. Furthermore, the control device comprises a second computation unit for forming the damping active power value and the damping reactive power value, wherein the damping active power value is formed from the multiplication, divided by the adjustable damping factor, of the low-pass-filtered d-component of the Park-Clarke transformation of filter capacitance voltages by the d-component of the Park-Clarke transformation of filter capacitance voltages which has been filtered in respect of the fundamental of the filter output currents. The damping reactive power value is also formed from the negative multiplication, divided by the adjustable damping factor, of the low-pass-filtered d-component of the Park-Clarke transformation of filter capacitance voltages by the q-component of the Park-Clarke transformation of filter capacitance voltages which has been filtered in respect of the fundamental of the filter output currents.

The exemplary embodiment of the apparatus for carrying out the disclosed method for the operation of the converter circuit can therefore be implemented very easily and inexpensively, since the circuit complexity can be kept extremely low and also only a small number of components is required for the design. This apparatus can therefore be used to carry out the method according to the disclosure particularly easily.

These and further objects, advantages and features of the present disclosure become obvious from the detailed description below of exemplary embodiments of the disclosure in conjunction with the drawing.

The reference symbols used in the drawing and their meaning are listed in summary in the list of reference symbols. In principle, identical parts are provided with the same reference symbols in the figures. The embodiments described are examples of the subject matter of the disclosure and are not limiting.

Figure 1:
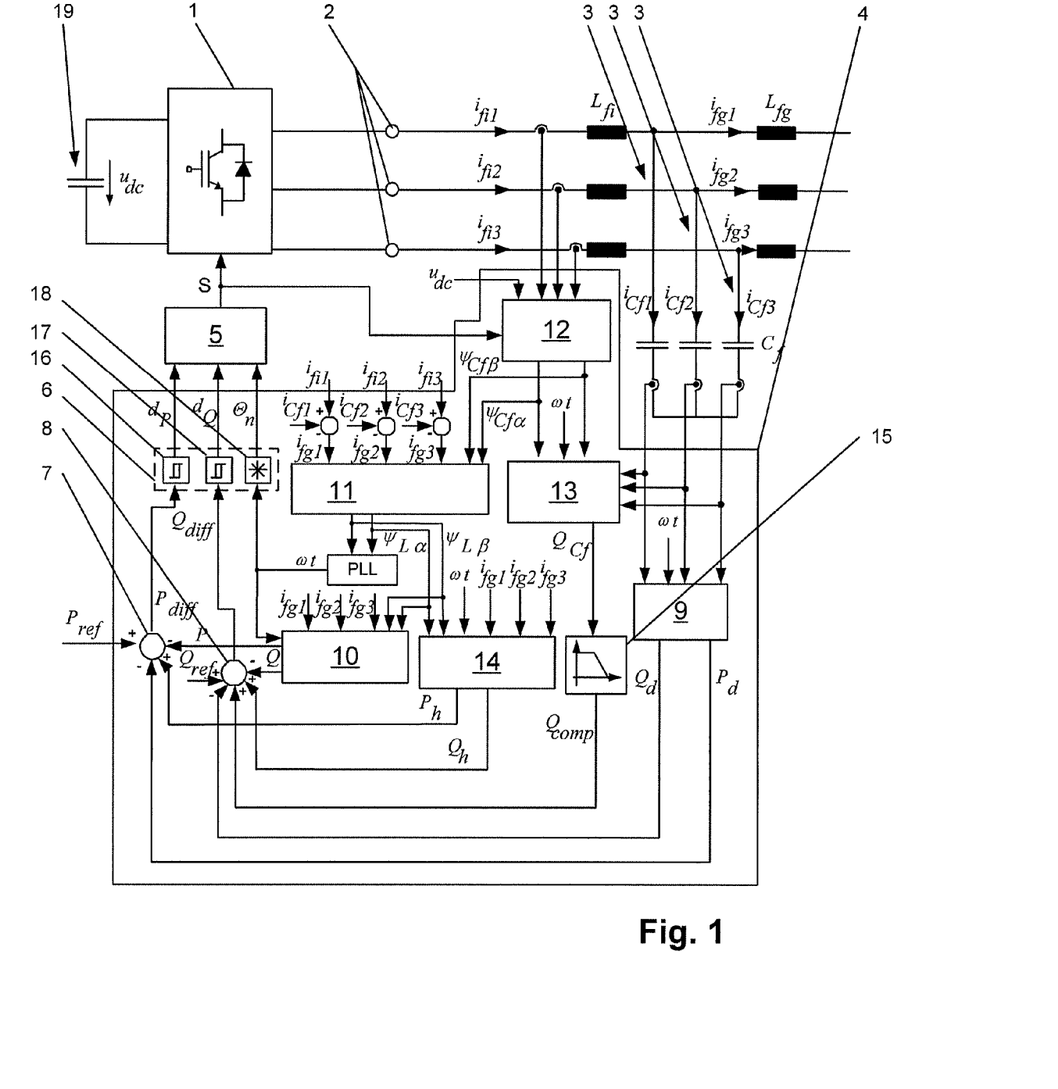
FIG. 1 shows an exemplary embodiment of an apparatus for carrying out the disclosed method for the operation of a converter circuit.

FIG. 1 shows an exemplary embodiment of an apparatus for carrying out the disclosed method for the operation of a converter circuit. The converter circuit in FIG. 1 has a converter unit 1 having a multiplicity of actuatable power semiconductor switches and an LCL filter 3 which is connected to each phase connection 2 of the converter unit 1. Accordingly, each LCL filter 3 has a first filter inductance $L_{fi}$, a second filter inductance $L_{fg}$ and a filter capacitance $C_f$, wherein the first filter inductance $L_{fi}$ is connected to the associated phase connection 2 of the converter unit 1, to the second filter inductance $L_{fg}$ and to the filter capacitance $C_f$. In addition, the filter capacitances $C_f$ of the individual LCL filters 3 are connected to one another. In FIG. 1, the converter unit 1 is of three-phase design by way of example. It should be mentioned that the converter unit 1 may generally be in the form of any converter unit 1 for switching ≧2 switching voltage levels (multi level converter circuit) in respect of the voltage of a capacitive energy store 19 connected to the converter unit 1, in which case the capacitive energy store 19 is then formed by any number of capacitances, which capacitances are then connected up so as to match the component converter circuit of appropriate design.

An exemplary method for the operation of the converter circuit now involves the actuatable power semiconductor switches of the converter unit 1 being actuated by means of an actuation signal S formed from a hysteresis active power value $d_P$, from a hysteresis reactive power value $d_Q$ and from a selected flux sector $\theta_n$. The actuation signal is commonly formed using an association table (look-up table), in which hysteresis active power values $d_P$, hysteresis reactive power values $d_Q$ and selected flux sectors $\theta_n$ are firmly associated with appropriate actuation signals S, or a modulator, which is based on pulse width modulation. In line with the disclosure, the hysteresis active power value $d_P$ is formed from a differential active power value $P_{diff}$ by means of a first hysteresis controller 16, as shown in FIG. 1. In addition, the differential active power value $P_{diff}$ is formed from the subtraction of an estimated active power value P and a damping active power value $P_d$ from a reference active power value $P_{ref}$, wherein the damping active power value $P_d$ is formed from a multiplication, divided by an adjustable damping factor $k_d$, of a low-pass-filtered d-component of the Park-Clarke transformation of filter capacitance voltages $u_{TCf,d}$ by a d-component of the Park-Clarke transformation of filter capacitance voltages $u_{GCf,d}$ which has been filtered in respect of the fundamental of the filter output currents $i_{fg1}$, $i_{fg2}$, $i_{fg3}$, as illustrated particularly by the formula below.

$$P_d = (u_{TCf,d} \cdot u_{GCf,d})/k_d$$

The reference active power value $P_{ref}$ is freely adjustable and is the setpoint value for the active power intended to be applied to the output of the LCL filters 3. In addition, the hysteresis reactive power value $d_Q$ is formed from a differential reactive power value $Q_{diff}$ by means of a second hysteresis controller 17, and the differential reactive power value $Q_{diff}$ is formed from the subtraction of an estimated reactive power value Q and a damping reactive power value $Q_d$ from a reference reactive power value $Q_{ref}$, wherein the damping reactive power value $Q_d$ is formed from a negative multiplication, divided by the adjustable damping factor $k_d$, of a low-pass-filtered d-component of the Park-Clarke transformation of filter capacitance voltages $u_{TCf,d}$ by a q-component of the Park-Clarke transformation of filter capacitance voltages $u_{GCf,q}$ which has been filtered in respect of the fundamental of the filter output currents $i_{fg1}$, $i_{fg2}$, $i_{fg3}$, as illustrated particularly by the formula below.

$$Q_d = -(u_{TCf,d} \cdot u_{GCf,q})/k_d$$

The reference reactive power value $Q_{ref}$ is freely adjustable and is the setpoint value for the reactive power intended to be applied to the output of the LCL filters 3.

It should be mentioned that the space vector transformation is defined as follows $$\bar{x} = x_\alpha + j x_\beta$$

where $\bar{x}$ is a complex variable, $x_\alpha$ is the α-component of the space vector transformation of the variable $\bar{x}$, and $x_\beta$ is the β-component of the space vector transformation of the variable $\bar{x}$. All the space vector transformations already mentioned and yet to be mentioned below for variables are produced according to the abovementioned formula.

The damping active power value $P_d$ and the damping reactive power value $Q_d$ can advantageously provide active damping for distortions, i.e. undesirable oscillations, in the filter output currents $i_{fg1}$, $i_{fg2}$, $i_{fg3}$ and filter output voltages, which means that these distortions are greatly reduced and at best are largely suppressed. A further advantage of the method according to the disclosure is that it is not necessary to connect a discrete, space-taking, complex and hence expensive damping resistor to the respective phase connection 2 in order to be able to effectively damp the undesirable distortions.

According to FIG. 1, the exemplary embodiment of the apparatus for carrying out the disclosed method for the operation of a converter circuit has, to this end, a control device 4 which is used to produce the hysteresis active power value $d_P$, the hysteresis reactive power value $d_Q$ and the selected flux sector $\theta_n$ and which is connected to the actuatable power semiconductor switches via an actuation circuit 5 for forming an actuation signal S. By way of example, the actuation circuit 5 comprises an association table (look-up table), in which hysteresis active power values $d_P$, hysteresis reactive power values $d_Q$ and selected flux sectors $\theta_n$ are firmly associated with appropriate actuation signals S, or a modulator, which is based on pulse width modulation. In line with the disclosure, the control device 4 comprises a first computation unit 6 for forming the hysteresis active power value $d_P$, the hysteresis reactive power value $d_Q$ and the selected flux sector $\theta_n$, wherein the first computation unit 6 has the first hysteresis controller 16 for forming the hysteresis active power value $d_P$ from the differential active power value $P_{diff}$, the second hysteresis controller 17 for forming the hysteresis reactive power value $d_Q$ from the differential reactive power value $Q_{diff}$ and a vector allocator 18 for forming the selected flux sector $\theta_n$. In addition, the control device 4 comprises a first summator 7 for forming the differential active power value $P_{diff}$ from the subtraction of the estimated active power value P and the damping active power value $P_d$ from the reference active power value $P_{ref}$ and a second summator 8 for forming the differential reactive power value $Q_{diff}$ from the subtraction of the estimated reactive power value Q and the damping reactive power value $Q_d$ from the reference reactive power value $Q_{ref}$. In addition, the control device 4 comprises a second computation unit 9 for forming the damping active power value $P_d$ and the damping reactive power value $Q_d$, wherein the damping active power value $P_d$ is formed from the multiplication, divided by the adjustable damping factor $k_d$, of the low-pass-filtered d-component of the Park-Clarke transformation of filter capacitance voltages $u_{TCf,d}$ by the d-component of the Park-Clarke transformation of filter capacitance voltages $u_{GCf,d}$ which has been filtered in respect of the fundamental of the filter output currents $i_{fg1}$, $i_{fg2}$, $i_{fg3}$, and the damping reactive power value $Q_d$ is formed from the negative multiplication, divided by the adjustable damping factor $k_d$, of the low-pass-filtered d-component of the Park-Clarke transformation of filter capacitance voltages $u_{TCf,d}$ by the Q-component of the Park-Clarke transformation of filter capacitance voltages $u_{GCf,q}$ which has been filtered in respect of the fundamental of the filter output currents $i_{fg1}$, $i_{fg2}$, $i_{fg3}$.

The exemplary embodiment of the apparatus for carrying out the method for the operation of the converter circuit is accordingly very simple and inexpensive to implement, since the circuit complexity can be kept extremely low and also only a small number of components is required for the design. This apparatus can therefore be used to carry out the method according to the disclosure particularly easily.

It should be mentioned that the Park-Clarke transformation is generally defined as $$\overline{x} = (x_d + jx_q) e^{j\omega t}$$

where $\overline{x}$ is a complex variable, $x_d$ is the d-component of the Park-Clarke transformation of the variable $\overline{x}$ and $x_q$ is the q-component of the Park-Clarke transformation of the variable $\overline{x}$. Advantageously, the Park-Clarke transformation involves transformation not only of the fundamental of the complex variable $\overline{x}$ but also of all harmonics of the complex variable $\overline{x}$ which arise.

The low-pass-filtered d-component of the Park-Clarke transformation of filter capacitance voltages $u_{TCf,d}$, the d-component of the Park-Clarke transformation of filter capacitance voltages $u_{GCf,d}$ which has been filtered in respect of the fundamental of the filter output currents $i_{fg1}$, $i_{fg2}$, $i_{fg3}$ and the q-component of the Park-Clarke transformation of filter capacitance voltages $u_{GCf,q}$ which has been filtered in respect of the fundamental of the filter output currents $i_{fg1}$, $i_{fg2}$, $i_{fg3}$ can be formed from the filter capacitance currents $i_{Cf1}, i_{Cf2}, i_{Cf3}$. To better illustrate the formation of the damping active power value $P_d$ and of the damping reactive power value $Q_d$, FIG. 5 shows an embodiment of the second computation unit 9 for this purpose, which also shows the formation of the low-pass-filtered d-component of the Park-Clarke transformation of filter capacitance voltages $u_{TCf,d}$ of the d-component of the Park-Clarke transformation of filter capacitance voltages $u_{GCf,d}$ which has been filtered in respect of the fundamental of the filter output currents $i_{fg1}$, $i_{fg2}$, $i_{fg3}$, and of the q-component of the Park-Clarke transformation of filter capacitance voltages $u_{GCf,q}$ which has been filtered in respect of the fundamental of the filter output currents $i_{fg1}$, $i_{fg2}$, $i_{fg3}$, from the filter capacitance currents $i_{Cf1}, i_{Cf2}, i_{Cf3}$.

Figure 5:
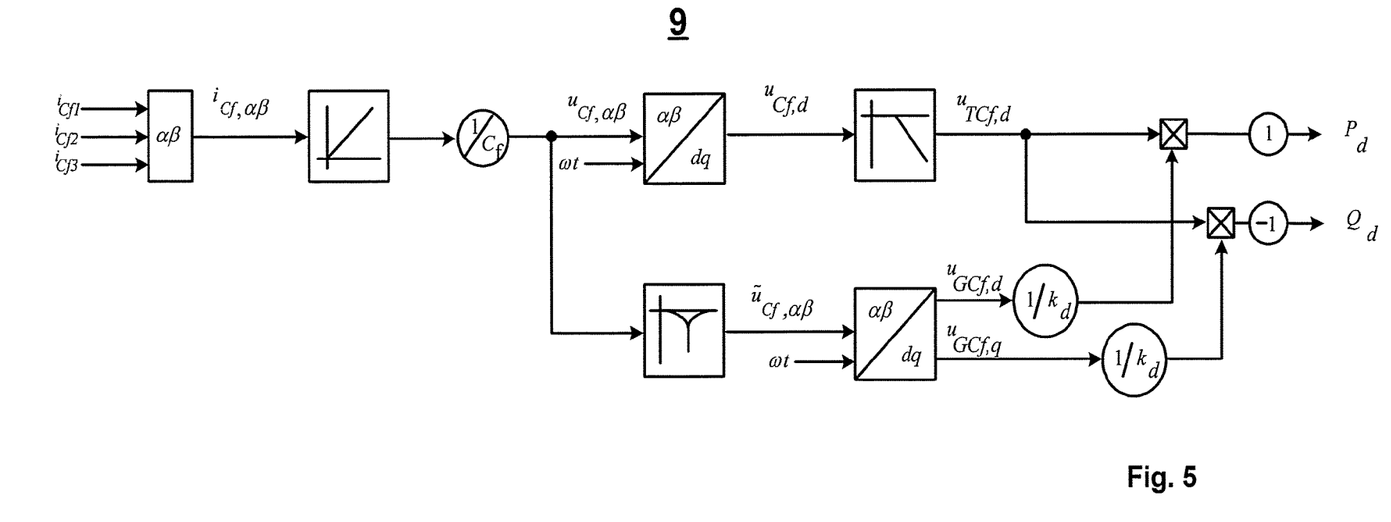
FIG. 5 shows an exemplary embodiment of a second computation unit.

According to FIG. 5, first of all the α-component and the β-component of the space vector transformation of the filter capacitance currents $i_{Cf,\alpha\beta}$ are formed from supplied filter capacitance currents $i_{Cf1}, i_{Cf2}, i_{Cf3}$ by means of space vector transformation. Thereafter, the α-component and the β-component of the space vector transformation of the filter capacitance currents $i_{Cf,\alpha\beta}$ are integrated, so that an α-component and a β-component of the space vector transformation of the filter capacitance voltages $u_{Cf,\alpha\beta}$ are produced. Thereafter, the α-component and the β-component of the space vector transformation of the filter capacitance voltages $u_{Cf,\alpha\beta}$ are subjected to Park-Clarke transformation, with only the resultant d-component of the Park-Clarke transformation of the filter capacitance voltages $u_{Cf,d}$ continuing to be used. Next, the d-component of the Park-Clarke transformation of the filter capacitance voltages $u_{Cf,d}$ is filtered by means of a low-pass filter, so that said low-pass-filtered d-component of the Park-Clarke transformation of filter capacitance voltages $u_{TCf,d}$ is generated. The advantageous effect of the low-pass filtering is that the low-pass-filtered d-component of the Park-Clarke transformation of filter capacitance voltages $u_{TCf,d}$ now has only one component of the fundamental for the filter output currents $i_{fg1}$, $i_{fg2}$, $i_{fg3}$, and accordingly all the harmonics are filtered out. In addition, filtering of the α-component and of the β-component of the space vector transformation of the filter capacitance voltages $u_{Cf,\alpha\beta}$ in respect of the fundamental of the filter output currents $i_{fg1}$, $i_{fg2}$, $i_{fg3}$ using a band-stop filter produces an α-component and a β-component of the space vector transformation of the filter capacitance voltages $\tilde{u}_{Cf,\alpha\beta}$ which have been filtered in respect of the fundamental of the filter output currents $i_{fg1}$, $i_{fg2}$, $i_{fg3}$. The advantageous effect of the filtering is that the α-component and β-component of the space vector transformation of the filter capacitance voltages $\tilde{u}_{Cf,\alpha\beta}$ which have been filtered in respect of the fundamental of the filter output currents $i_{fg1}$, $i_{fg2}$, $i_{fg3}$ advantageously now have only components of the harmonics for the filter output currents $i_{fg1}$, $i_{fg2}$, $i_{fg3}$ and accordingly the component of the fundamental is filtered out. The component of the fundamental for the filter output currents $i_{fg1}$, $i_{fg2}$, $i_{fg3}$ advantageously corresponds to a resonant frequency on the basis of the second filter inductance $L_{fg}$ and the filter capacitance $C_f$, which is then obtained as $$\omega_R = \sqrt{\frac{1}{L_{fg} \cdot C_f}}.$$

Thereafter, according to FIG. 5, the α-component and β-component of the space vector transformation of the filter capacitance voltages $\tilde{u}_{Cf,\alpha\beta}$ which have been filtered in respect of the fundamental of the filter output currents $i_{fg1}$, $i_{fg2}$, $i_{fg3}$ are subjected to Park-Clarke transformation, as a result of which said d-component of the Park-Clarke transformation of filter capacitance voltages $u_{GCf,d}$ which has been filtered in respect of the fundamental of the filter output currents $i_{fg1}$, $i_{fg2}$, $i_{fg3}$ and the q-component of the Park-Clarke transformation of filter capacitance voltages $u_{GCf,q}$ which has been filtered in respect of the fundamental of the filter output currents $i_{fg1}$, $i_{fg2}$, $i_{fg3}$ are then produced. According to FIG. 5, the formulae already explained in detail above are then used to form the damping active power value $P_d$ from the multiplication, divided by the adjustable damping factor $k_d$, of the low-pass-filtered d-component of the Park-Clarke transformation of filter capacitance voltages $u_{TCf,d}$ by the d-component of the Park-Clarke transformation of filter capacitance voltages $u_{GCf,d}$ which has been filtered in respect of the fundamental of the filter output currents $i_{fg1}$, $i_{fg2}$, $i_{fg3}$, and to form the damping reactive power value $Q_d$ from the negative multiplication, divided by the adjustable damping factor $k_d$, of the low-pass-filtered d-component of the Park-Clarke transformation of filter capacitance voltages $u_{TCf,d}$ by the q-component of the Park-Clarke transformation of filter capacitance voltages $u_{GCf,q}$ which has been filtered in respect of the fundamental of the filter output currents $i_{fg1}$, $i_{fg2}$, $i_{fg3}$.

The estimated active power value P and the estimated reactive power value Q, which have already been mentioned above, are respectively formed from an α-component of the space vector transformation of filter output currents $i_{fg\alpha}$, from a β-component of the space vector transformation of filter output currents $i_{fg\beta}$, from an α-component of the space vector transformation of filter output fluxes $\psi_{L\alpha}$ and from a β-component of the space vector transformation of filter output fluxes $\psi_{L\beta}$, as illustrated particularly by the formulae below.

$$P = \omega \cdot (\psi_{L\alpha} \cdot i_{fg\beta} - \psi_{L\beta} \cdot i_{fg\alpha})$$

$$Q = \omega \cdot (\psi_{L\alpha} \cdot i_{fg\alpha} + \psi_{L\beta} \cdot i_{fg\beta})$$

For the purpose of forming the estimated active power value P and the estimated reactive power value Q, the control device 4 shown in FIG. 1 has a third computation unit 10 which is used to calculate the estimated active power value P and the estimated reactive power value Q in each case on the basis of the associated formula cited above.

The α-component of the space vector transformation of filter output fluxes $\psi_{L\alpha}$ is formed from an α-component of the space vector transformation of estimated filter capacitance fluxes $\psi_{Cf\alpha}$ and from the α-component of the space vector transformation of filter output currents $i_{fg\alpha}$, as illustrated particularly by the formula below.

$$\psi_{L\alpha} = \psi_{Cf\alpha} - L_{fg} \cdot i_{fg\alpha}$$

In addition, the β-component of the space vector transformation of filter output fluxes $\psi_{L\beta}$ is formed from a β-component of the space vector transformation of estimated filter capacitance fluxes $\psi_{C\!f\beta}$ and from the β-component of the space vector transformation of filter output currents $i_{fg\beta}$, as illustrated particularly by the formula below.

$$\psi_{L\beta}=\psi_{C\!f\beta}-L_{fg}\cdot i_{fg\beta}$$

For the purpose of forming the α-component of the space vector transformation of filter output fluxes $\psi_{L\alpha}$, and the β-component of the space vector transformation of filter output fluxes $\psi_{L\beta}$, the control device 4 shown in FIG. 1 has a fourth computation unit 11, which is used to calculate the α-component of the space vector transformation of filter output fluxes $\psi_{L\alpha}$, and the β-component of the space vector transformation of filter output fluxes $\psi_{L\beta}$ in each case on the basis of the associated formula cited above.

The α-component of the space vector transformation of filter output currents $i_{fg\alpha}$, is formed from the α-component of the space vector transformation of phase connection currents $i_{fi\alpha}$, which is formed by space vector transformation of the phase connection currents $i_{fi1}$, $i_{fi2}$, $i_{fi3}$ measured in line with FIG. 1, and from the α-component of the space vector transformation of the filter capacitance currents $i_{C\!f\alpha}$, which is formed by space vector transformation of the filter capacitance currents $i_{Cf1}$, $i_{Cf2}$, $i_{Cf3}$ measured in line with FIG. 1, by means of summation. In addition, the β-component of the space vector transformation of filter output currents $i_{fg\beta}$ is formed from the β-component of the space vector transformation of phase connection currents $i_{fi\beta}$, which is formed by space vector transformation of the phase connection currents $i_{fi1}$, $i_{fi2}$, $i_{fi3}$ measured in line with FIG. 1, and from the β-component of the space vector transformation of the filter capacitance currents $i_{C\!f\beta}$, which is formed by space vector transformation of the filter capacitance currents $i_{Cf1}$, $i_{Cf2}$, $i_{Cf3}$ measured in line with FIG. 1, by means of summation. Measurement of the filter output currents $i_{fg1}$, $i_{fg2}$, $i_{fg3}$ can therefore advantageously be dispensed with, which simplifies the apparatus, since no measurement sensors, particularly no current transformers, are required. It should be mentioned that the space vector transformation of the measured phase connection currents $i_{fi1}$, $i_{fi2}$, $i_{fi3}$ and of the measured filter capacitance currents $i_{Cf1}$, $i_{Cf2}$, $i_{Cf3}$ and also of the other space-vector-transformed variables is effected or can be effected within an associated computation unit 9, 10, 13, 14 or separately in a space vector transformation unit provided separately for this purpose.

The α-component of the space vector transformation of estimated filter capacitance fluxes $\psi_{C\!f\alpha}$ in turn is formed from a present DC voltage value $u_{dc}$ for the capacitive energy store 19 connected to the converter unit 1, from the actuation signal S and from the α-component of the space vector transformation of phase connection currents $i_{fi\alpha}$, as illustrated particularly via the formula below, where $u_{C\alpha}$ is the α-component of the phase connection voltage of the converter unit 1, said x-component being formed from the present DC voltage value $u_{dc}$ and from the actuation signal.

$$\psi_{C\!f\alpha}=\int u_{C\alpha}dt-L_{fi}\cdot i_{fi\alpha}$$

Accordingly, the β-component of the space vector transformation of estimated filter capacitance fluxes $\psi_{C\!f\beta}$ is formed from the present DC voltage value $u_{dc}$ of the capacitive energy store 19 connected to the converter unit 1, from the actuation signal S and from the β-component of the space vector transformation of phase connection currents $i_{fi\beta}$, wherein $u_{C\beta\alpha}$ is the β-component of the phase connection voltage of the converter unit 1, said β-component being formed from the present DC voltage value $u_{dc}$ and from the actuation signal.

$$\psi_{C\!f\beta}=\int u_{C\beta}dt-L_{fi}\cdot i_{fi\beta}$$

For the purpose of forming the α-component of the space vector transformation of estimated filter capacitance fluxes $\psi_{C\!f\alpha}$ and the β-component of the space vector transformation of estimated filter capacitance fluxes $\psi_{C\!f\beta}$, the control device 4 shown in FIG. 1 has a fifth computation unit 12 which is used to calculate the α-component of the space vector transformation of estimated filter capacitance fluxes $\psi_{C\!f\alpha}$ and the β-component of the space vector transformation of estimated filter capacitance fluxes $\psi_{C\!f\beta}$ in each case on the basis of the associated formula cited above.

The aforementioned differential reactive power value $Q_{diff}$ is formed by additionally adding a compensation reactive power value $Q_{comp}$, wherein the compensation reactive power value $Q_{comp}$ is formed by low-pass filtering of an estimated filter capacitance reactive power value $Q_{Cf}$ using a low-pass filter 15. This advantageously prevents undesirable reactive power components from the LCL filters 3, particularly from the filter capacitances $C_f$ of the LCL filters 3, from being applied to the output of the LCL filters 3, so that it is possible to ensure that the output of the LCL filters 3 produces only a reactive power value corresponding to the adjusted reference reactive power value $Q_{ref}$. According to FIG. 1, the second summator 8 is additionally supplied with the compensation reactive power value $Q_{comp}$. In addition, the estimated filter capacitance reactive power value $Q_{Cf}$ is formed from the α-component of the space vector transformation of the filter capacitance currents $i_{C\!f\alpha}$, from the β-component of the space vector transformation of the filter capacitance currents $i_{C\!f\beta}$, from the α-component of the space vector transformation of the estimated filter capacitance fluxes $\psi_{C\!f\alpha}$ and from the β-component of the space vector transformation of the estimated filter capacitance fluxes $\psi_{C\!f\beta}$, as illustrated particularly by the formula below.

$$Q_{Cf}=\omega\cdot(\psi_{C\!f\alpha}\cdot i_{C\!f\alpha}+\psi_{C\!f\beta}\cdot i_{C\!f\beta})$$

For the purpose of forming the estimated filter capacitance reactive power value $Q_{Cf}$ shown in FIG. 1, the control device 4 has a sixth computation unit 13 which is used to calculate the estimated filter capacitance reactive power value $Q_{Cf}$ on the basis of the formula cited above.

Figure 2:
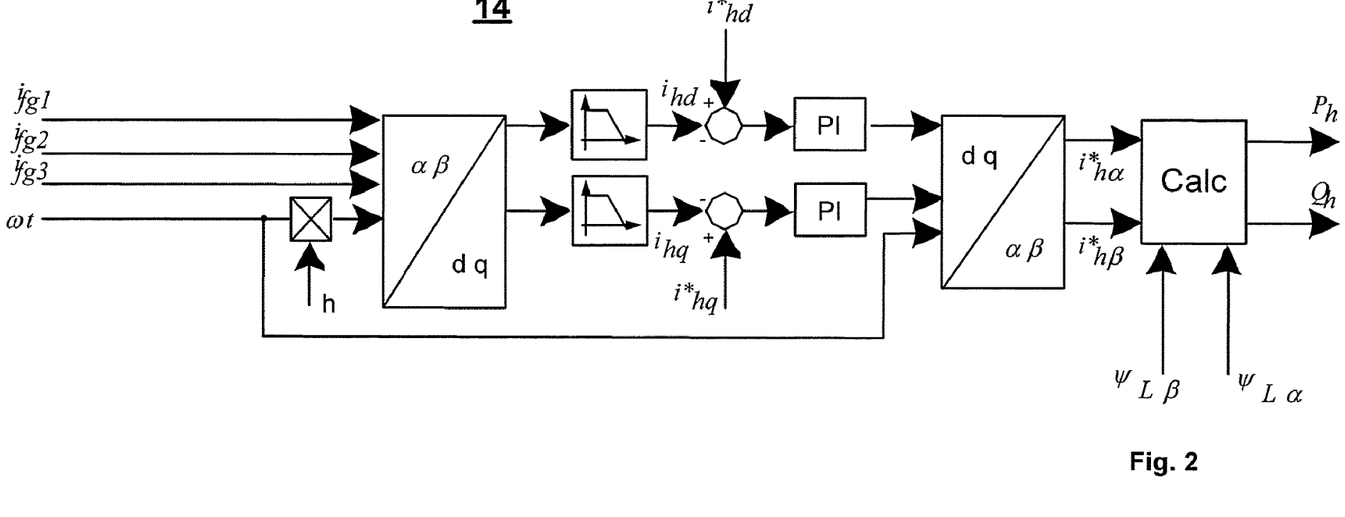
FIG. 2 shows an exemplary embodiment of a seventh computation unit.

The aforementioned differential active power value $P_{diff}$ is formed by additionally adding at least one compensation harmonic active power value $P_h$ for the fundamental of the filter output currents $i_{fg1}$, $i_{fg2}$, $i_{fg3}$. In addition, the aforementioned differential reactive power value $Q_{diff}$ is formed by additionally adding at least one compensation harmonic reactive power value $Q_h$ for the fundamental of the filter output currents $i_{fg1}$, $i_{fg2}$, $i_{fg3}$. According to FIG. 1, the first summator 7 is additionally supplied with the compensation harmonic active power value $P_h$ for the purpose of forming the differential active power value $P_{diff}$. Furthermore, the second summator 7 is additionally supplied with the compensation harmonic reactive power value $Q_h$ for the purpose of forming the differential reactive power value $Q_{diff}$ shown in FIG. 1. The compensation harmonic active power value $P_h$ and the compensation harmonic reactive power value $Q_h$ are respectively formed from the α-component of the space vector transformation of the filter output currents $i_{fg\alpha}$, from the β-component of the space vector transformation of the filter output currents $i_{fg\beta}$, from the α-component of the space vector transformation of the filter output fluxes $\psi_{L\alpha}$, from the β-component of the space vector transformation of the filter output fluxes $\psi_{L\beta}$ and from the fundamental angle ωt for the fundamental of the filter output currents $i_{fg1}$, $i_{fg2}$, $i_{fg3}$. The fundamental angle ωt is provided for the computation units 9, 10, 13, 14 and the vector allocator 18 shown in FIG. 1 by a phase locked loop (PLL). According to FIG. 1, the control device 4 has a seventh computation unit 14 for forming the compensation harmonic active power value $P_h$ and the compensation harmonic reactive power value $Q_h$, FIG. 2 showing an embodiment of the seventh computation unit 14. The advantageous effect of adding or connecting at least one compensation harmonic active power value $P_h$ for forming the differential active power value $P_{diff}$ and at least one compensation harmonic reactive power value $Q_h$ for forming the differential reactive power value $Q_{diff}$ is an active decrease in harmonics and hence overall a further improvement in the reduction of harmonics.

According to FIG. 2, first of all the α-component of the space vector transformation of the filter output currents $i_{fg\alpha}$, and the β-component of the space vector transformation of the filter output currents $i_{fg\beta}$ are formed from supplied filter output currents $i_{fg1}$, $i_{fg2}$, $i_{fg3}$ by means of space vector transformation. Subsequently, the α-component of the space vector transformation of the filter output currents $i_{fg\alpha}$, and the β-component of the space vector transformation of the filter output currents $i_{fg\beta}$ are subjected to Park-Clarke transformation, low-pass filtering and are output as the d-component and the q-component of the Park-Clarke transformation of at least one desired selected harmonic of the filter output currents $i_{hd}$, $i_{hq}$ for the fundamental of the filter output currents $i_{fg1}$, $i_{fg2}$, $i_{fg3}$. The index h represents the h-th harmonic of this and subsequently mentioned variables, where h=1, 2, 3, . . . .

According to FIG. 2, the d-component and the q-component of the Park-Clarke transformation of the desired selected h-th harmonic of the filter output currents $i_{hd}$, $i_{hq}$ are respectively adjusted to an associated prescribable reference value $i*_{hd}$, $i*_{hq}$, e.g., on the basis of a proportional integral characteristic, and then subjected to inverse Park-Clarke transformation, which forms an α-component of the space vector transformation of the h-th harmonic of reference filter output currents $i*_{h\alpha}$, and a β-component of the space vector transformation of the h-th harmonic of reference filter output currents $i*_{h\beta}$. Finally, the compensation harmonic active power value $P_h$ and the compensation harmonic reactive power value $Q_h$ are respectively calculated from the α-component of the space vector transformation of the h-th harmonic of reference filter output currents $i*_{h\alpha}$, the β-component of the space vector transformation of the h-th harmonic of reference filter output currents $i*_{h\beta}$, the α-component of the space vector transformation of the filter output fluxes $\psi_{L\alpha}$, and from the β-component of the space vector transformation of the filter output fluxes $\psi_L$, as illustrated particularly by the following formulae.

$$P_h = \omega \cdot (\psi_{L\alpha} \cdot i*_{h\beta} - \psi_{L\beta} \cdot i*_{h\alpha})$$

$$Q_h = \omega \cdot (\psi_{L\alpha} \cdot i*_{h\alpha} + \psi_{L\beta} \cdot i*_{h\beta})$$

Figure 4:
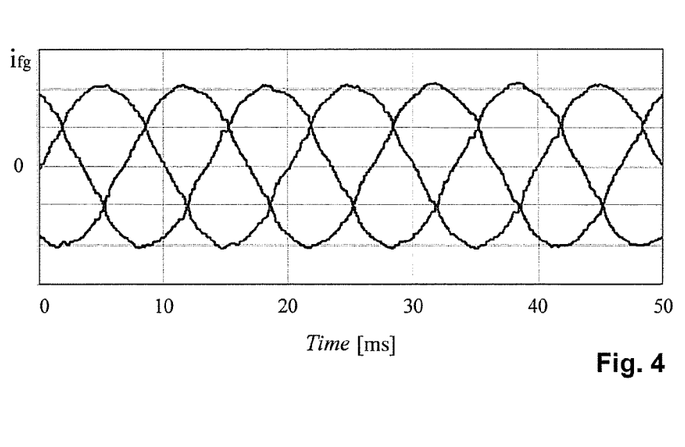
FIG. 4 shows an exemplary time profile for the filter output currents with active damping according to the disclosed method.

FIG. 3 shows a common time profile for the filter output currents $i_{fg1}$, $i_{fg2}$, $i_{fg3}$. To illustrate the mode of action of the active damping according to the exemplary method explained above, FIG. 4 shows a time profile for the filter output currents $i_{fg1}$, $i_{fg2}$, $i_{fg3}$, in which undesirable oscillations in the filter output currents $i_{fg1}$, $i_{fg2}$, $i_{fg3}$ are actively damped, so that these distortions are greatly reduced. In addition, the additional active decrease in harmonics according to the exemplary method described above brings about a further improvement in the reduction of harmonics.

All the steps of the method according to the disclosure can be implemented as software, these then being loaded onto a computer system, for example, particularly with a digital signal processor, and being able to be executed thereon. The digital delay times which arise in such a system, particularly for the calculations, can be taken into account in general fashion in the Park-Clarke transformation by means of the addition of an additional term to the fundamental frequency ωt, for example. In addition, the exemplary embodiment of the apparatus described in detail above can also be implemented in the computer system, particularly in a digital signal processor.

All in all, it has been possible to show that the exemplary embodiment of the apparatus—shown particularly in FIG. 1—for carrying out the disclosed method for the operation of the converter circuit can be implemented very easily and inexpensively, since the circuit complexity is extremely low and also only a small number of components is required for the design. This apparatus can therefore be used to carry out the method according to the disclosure particularly easily.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| | List of reference symbols |
|---|---|
| 1 | converter unit |
| 2 | phase connection of the converter unit |
| 3 | LCL filter |
| 4 | control device |
| 5 | actuation circuit |
| 6 | first computation unit |
| 7 | first summator |
| 8 | second summator |
| 9 | second computation unit |
| 10 | third computation unit |
| 11 | fourth computation unit |
| 12 | fifth computation unit |
| 13 | sixth computation unit |
| 14 | seventh computation unit |
| 15 | low-pass filter |
| 16 | first hysteresis controller |
| 17 | second hysteresis controller |
| 18 | vector allocator |

What is claimed is:

1. A method for the operation of a converter circuit, wherein the converter circuit has a converter unit having a multiplicity of actuatable power semiconductor switches and an LCL filter which is connected to each phase connection of the converter unit, in which the actuatable power semiconductor switches are actuated by means of an actuation signal (S) formed from a hysteresis active power value ($d_P$), from a hysteresis reactive power value ($d_Q$) and from a selected flux sector ($\theta_n$), wherein the hysteresis active power value ($d_P$) is formed from a differential active power value ($P_{diff}$) by means of a first hysteresis controller, wherein the differential active power value ($P_{diff}$) is formed from the subtraction of an estimated active power value (P) and a damping active power value ($P_d$) from a reference active power value ($P_{ref}$), wherein the damping active power value ($P_d$) is formed from a multiplication, divided by an adjustable damping factor ($k_d$), of a low-pass-filtered d-component of the Park-Clarke transformation of filter capacitance voltages ($u_{TCf,d}$) by a d-component of the Park-Clarke transformation of filter capacitance voltages ($u_{GCf,d}$) which has been filtered in respect of the fundamental of the filter output currents ($i_{fg1}$, $i_{fg2}$, $i_{fg3}$), wherein the hysteresis reactive power value ($d_Q$) is formed from a differential reactive power value ($Q_{diff}$) by means of a second hysteresis controller, wherein the differential reactive power value ($Q_{diff}$) is formed from the subtraction of an estimated reactive power value (Q) and a damping reactive power value ($Q_d$) from a reference reactive power value ($Q_{ref}$), wherein the damping reactive power value ($Q_d$) is formed from a negative multiplication, divided by the adjustable damping factor ($k_d$), of a low-pass-filtered d-component of the Park-Clarke transformation of filter capacitance voltages ($u_{TCf,d}$) by a q-component of the Park-Clarke transformation of filter capacitance voltages ($u_{GCf,q}$) which has been filtered in respect of the fundamental of the filter output currents ($i_{fg1}$, $i_{fg2}$, $i_{fg3}$).

2. The method as claimed in claim 1, wherein the low-pass-filtered d-component of the Park-Clarke transformation of filter capacitance voltages ($u_{TCf,d}$), the d-component of the Park-Clarke transformation of filter capacitance voltages ($u_{GCf,d}$) which has been filtered in respect of the fundamental of the filter output currents ($i_{fg1}$, $i_{fg2}$, $i_{fg3}$) and the q-component of the Park-Clarke transformation of filter capacitance voltages ($u_{GCf,q}$) which has been filtered in respect of the fundamental of the filter output currents ($i_{fg1}$, $i_{fg2}$, $i_{fg3}$) are formed from the filter capacitance currents ($i_{Cf1}$, $i_{Cf2}$, $i_{Cf3}$).

3. The method as claimed in claim 2, wherein the estimated active power value (P) and the estimated reactive power value (Q) are respectively formed from an α-component of the space vector transformation of filter output currents ($i_{fg\alpha}$), from a β-component of the space vector transformation of filter output currents ($i_{fg\beta}$), from an α-component of the space vector transformation of filter output fluxes ($\psi_{L\alpha}$) and from a β-component of the space vector transformation of filter output fluxes ($\psi_{L\beta}$).

4. The method as claimed in claim 1, wherein the estimated active power value (P) and the estimated reactive power value (Q) are respectively formed from an α-component of the space vector transformation of filter output currents ($i_{fg\alpha}$), from a β-component of the space vector transformation of filter output currents ($i_{fg\beta}$), from an α-component of the space vector transformation of filter output fluxes ($\psi_{L\alpha}$) and from a β-component of the space vector transformation of filter output fluxes ($\psi_{L\beta}$).

5. The method as claimed in claim 4, wherein the α-component of the space vector transformation of filter output fluxes ($\psi_{L\alpha}$) is formed from an α-component of the space vector transformation of estimated filter capacitance fluxes ($\psi_{Cf\alpha}$) and from the α-component of the space vector transformation of filter output currents ($i_{fg\alpha}$), and wherein the β-component of the space vector transformation of filter output fluxes ($\psi_{L\beta}$) is formed from a β-component of the space vector transformation of estimated filter capacitance fluxes ($\psi_{Cf\beta}$) and from the β-component of the space vector transformation of filter output currents ($i_{fg\beta}$).

6. The method as claimed in claim 5, wherein the α-component of the space vector transformation of estimated filter capacitance fluxes ($\psi_{Cf\alpha}$) is formed from a present DC voltage value ($u_{dc}$) for a capacitive energy store connected to the converter unit, from the actuation signal (S) and from the α-component of the space vector transformation of phase connection currents ($i_{f\alpha}$) and wherein the β-component of the space vector transformation of estimated filter capacitance fluxes ($\psi_{Cf\beta}$) is formed from the present DC voltage value ($u_{dc}$) of the capacitive energy store connected to the converter unit, from the actuation signal (S) and from the β-component of the space vector transformation of phase connection currents ($i_{f\beta}$).

7. The method as claimed in claim 6, wherein the differential reactive power value ($Q_{diff}$) is formed by additionally adding a compensation reactive power value ($Q_{comp}$), wherein the compensation reactive power value ($Q_{comp}$) is formed by low-pass filtering an estimated filter capacitance reactive power value ($Q_{Cf}$).

8. The method as claimed in claim 4, wherein the differential reactive power value ($Q_{diff}$) is formed by additionally adding a compensation reactive power value ($Q_{comp}$), wherein the compensation reactive power value ($Q_{comp}$) is formed by low-pass filtering an estimated filter capacitance reactive power value ($Q_{Cf}$).

9. The method as claimed in claim 8, wherein the estimated filter capacitance reactive power value ($Q_{Cf}$) is formed from the α-component of the space vector transformation of the filter capacitance currents ($i_{Cf\alpha}$), from the β-component of the space vector transformation of the filter capacitance currents ($i_{Cf\beta}$), from the α-component of the space vector transformation of the estimated filter capacitance fluxes ($\psi_{Cf\alpha}$) and from the β-component of the space vector transformation of the estimated filter capacitance fluxes ($\psi_{Cf\beta}$).

10. The method as claimed in claim 9, wherein the differential active power value ($P_{diff}$) is formed by additionally adding at least one compensation harmonic active power value ($P_h$) for the fundamental of the filter output currents ($i_{fg1}$, $i_{fg2}$, $i_{fg3}$), and wherein the differential reactive power value ($Q_{diff}$) is formed by additionally adding at least one compensation harmonic reactive power value ($Q_h$) for the fundamental of the filter output currents ($i_{fg1}$, $i_{fg2}$, $i_{fg3}$).

11. The method as claimed in claim 5, wherein the differential active power value ($P_{diff}$) is formed by additionally adding at least one compensation harmonic active power value ($P_h$) for the fundamental of the filter output currents ($i_{fg1}$, $i_{fg2}$, $i_{fg3}$), and wherein the differential reactive power value ($Q_{diff}$) is formed by additionally adding at least one compensation harmonic reactive power value ($Q_h$) for the fundamental of the filter output currents ($i_{fg1}$, $i_{fg2}$, $i_{fg3}$).

12. The method as claimed in claim 11, wherein the compensation harmonic active power value ($P_h$) and the compensation harmonic reactive power value ($Q_h$) are respectively formed from the α-component of the space vector transformation of the filter output currents ($i_{fg\alpha}$), from the β-component of the space vector transformation of the filter output currents ($i_{fg\beta}$), from the α-component of the space vector transformation of the filter output fluxes ($\psi_{L\alpha}$) from the β-component of the space vector transformation of the filter output fluxes ($\psi_{L\beta}$) and from the fundamental angle ($\omega t$) for the fundamental of the filter output currents ($i_{fg1}$, $i_{fg2}$, $i_{fg3}$).

13. An apparatus for carrying out a method for the operation of a converter circuit, wherein the converter circuit has a converter unit having a multiplicity of actuatable power semiconductor switches and an LCL filter which is connected to each phase connection of the converter unit, having a control device which is used to produce a hysteresis active power value ($d_P$), a hysteresis reactive power value ($d_Q$) and a selected flux sector ($\theta_n$) and which is connected to the actuatable power semiconductor switches via an actuation circuit for forming an actuation signal (S), wherein the control device comprises:

a first computation unit for forming the hysteresis active power value ($d_P$), the hysteresis reactive power value ($d_Q$) and the selected flux sector ($\theta_n$), wherein the first computation unit has a first hysteresis controller for forming the hysteresis active power value ($d_P$) from a differential active power value ($P_{diff}$), a second hysteresis controller for forming the hysteresis reactive power value ($d_Q$) from a differential reactive power value ($Q_{diff}$) and a vector allocator for forming the selected flux sector ($\theta_n$), a first summator for forming the differential active power value ($P_{diff}$) from the subtraction of an estimated active power value (P) and a damping active power value ($P_d$) from a reference active power value ($P_{ref}$), a second summator for forming the differential reactive power value ($Q_{diff}$) from the subtraction of an estimated reactive power value (Q) and a damping reactive power value ($Q_d$) from a reference reactive power value ($Q_{ref}$), a second computation unit for forming the damping active power value ($P_d$) and the damping reactive power value ($Q_d$), wherein the damping active power value ($P_d$) is formed from a multiplication, divided by an adjustable damping factor ($k_d$), of a low-pass-filtered d-component of the Park-Clarke transformation of filter capacitance voltages ($u_{TCf,d}$) by a d-component of the Park-Clarke transformation of filter capacitance voltages ($u_{GCf,d}$) which has been filtered in respect of the fundamental of the filter output currents ($i_{fg1}, i_{fg2}, i_{fg3}$), and the damping reactive power value ($Q_d$) is formed from a negative multiplication, divided by the adjustable damping factor ($k_d$), of a low-pass-filtered d-component of the Park-Clarke transformation of filter capacitance voltages ($u_{TCf,d}$) by a q-component of the Park-Clarke transformation of filter capacitance voltages ($u_{GCf,q}$) which has been filtered in respect of the fundamental of the filter output currents ($i_{fg1}, i_{fg2}, i_{fg3}$).

14. The apparatus as claimed in claim 13, wherein the second computation unit forms the low-pass-filtered d-component of the Park-Clarke transformation of filter capacitance voltages ($u_{TCf,d}$), the d-component of the Park-Clarke transformation of filter capacitance voltages ($u_{GCf,d}$) which has been filtered in respect of the fundamental of the filter output currents ($i_{fg1}, i_{fg2}, i_{fg3}$), and the q-component of the Park-Clarke transformation of filter capacitance voltages ($u_{GCf,q}$) which has been filtered in respect of the fundamental of the filter output currents ($i_{fg1}, i_{fg2}, i_{fg3}$), from the filter capacitance currents ($i_{Cf1}, i_{Cf2}, i_{Cf3}$).

15. The apparatus as claimed in claim 14, wherein the control device has a third computation unit for forming the estimated active power value (P) and the estimated reactive power value (Q) respectively from an α-component of the space vector transformation of filter output currents ($i_{fg\alpha}$) from a β-component of the space vector transformation of filter output currents ($i_{fg\beta}$) from an α-component of the space vector transformation of filter output fluxes ($\psi_{L\alpha}$) and from a β-component of the space vector transformation of filter output fluxes ($\psi_{L\beta}$).

16. The apparatus as claimed in claim 13, wherein the control device has a third computation unit for forming the estimated active power value (P) and the estimated reactive power value (Q) respectively from an α-component of the space vector transformation of filter output currents ($i_{fg\alpha}$), from a β-component of the space vector transformation of filter output currents ($i_{fg\beta}$), from an α-component of the space vector transformation of filter output fluxes ($\psi_{L\alpha}$) and from a β-component of the space vector transformation of filter output fluxes ($\psi_{L\beta}$).

17. The apparatus as claimed in claim 16, wherein the control device has a fourth computation unit for forming the α-component of the space vector transformation of filter output fluxes ($\psi_{L\alpha}$) and the β-component of the space vector transformation of filter output fluxes ($\psi_{L\beta}$), wherein the α-component of the space vector transformation of filter output fluxes ($\psi_{L\alpha}$) is formed from an α-component of the space vector transformation of estimated filter capacitance fluxes ($\psi_{Cf\alpha}$) and from the α-component of the space vector transformation of filter output currents ($i_{fg\alpha}$), and the β-component of the space vector transformation of filter output fluxes ($\psi_{L\beta}$) is formed from a β-component of the space vector transformation of estimated filter capacitance fluxes ($\psi_{Cf\beta}$) and from the β-component of the space vector transformation of filter output currents ($i_{fg\beta}$).

18. The apparatus as claimed in claim 17, wherein the control device has a fifth computation unit for forming the α-component of the space vector transformation of estimated filter capacitance fluxes ($\psi_{Cf\alpha}$) and the β-component of the space vector transformation of estimated filter capacitance fluxes ($\psi_{Cf\beta}$), wherein the α-component of the space vector transformation of estimated filter capacitance fluxes ($\psi_{Cf\alpha}$) is formed from a present DC voltage value ($u_{dc}$) for a capacitive energy store connected to the converter unit, from the actuation signal (S) and from the α-component of the space vector transformation of phase connection currents ($i_{fi\alpha}$), and the β-component of the space vector transformation of estimated filter capacitance fluxes ($\psi_{Cf\beta}$) is formed from the present DC voltage value ($u_{dc}$) of the capacitive energy store connected to the converter unit, from the actuation signal (S) and from the β-component of the space vector transformation of phase connection currents ($i_{fi\beta}$).

19. The apparatus as claimed in claim 18, wherein the second summator is additionally supplied with a compensation reactive power value ($Q_{comp}$) for the purpose of forming the differential reactive power value ($Q_{diff}$), wherein the compensation reactive power value ($Q_{comp}$) is formed by low-pass filtering an estimated filter capacitance reactive power value ($Q_{Cf}$) using a low-pass filter.

20. The apparatus as claimed in claim 17, wherein the second summator is additionally supplied with a compensation reactive power value ($Q_{comp}$) for the purpose of forming the differential reactive power value ($Q_{diff}$), wherein the compensation reactive power value ($Q_{comp}$) is formed by low-pass filtering an estimated filter capacitance reactive power value ($Q_{Cf}$) using a low-pass filter.

21. The apparatus as claimed in claim 20, wherein the control device has a sixth computation unit for forming the estimated filter capacitance reactive power value ($Q_{Cf}$) from the α-component of the space vector transformation of the filter capacitance currents ($i_{Cf\alpha}$), from the β-component of the space vector transformation of the filter capacitance currents ($i_{Cf\beta}$), from the α-component of the space vector transformation of the estimated filter capacitance fluxes ($\psi_{Cf\alpha}$) and from the β-component of the space vector transformation of the estimated filter capacitance fluxes ($\psi_{Cf\beta}$).

22. The apparatus as claimed in claim 21, wherein the first summator is additionally supplied with at least one compensation harmonic active power value ($P_h$) for the fundamental of the filter output currents ($i_{fg1}, i_{fg2}, i_{fg3}$) for the purpose of forming the differential active power value ($P_{diff}$), and wherein the second summator is additionally supplied with at least one compensation harmonic reactive power value ($Q_h$) for the fundamental of the filter output currents ($i_{fg1}, i_{fg2}, i_{fg3}$) for the purpose of forming the differential reactive power value ($Q_{diff}$).

23. The apparatus as claimed in claim 17, wherein the first summator is additionally supplied with at least one compensation harmonic active power value ($P_h$) for the fundamental of the filter output currents ($i_{fg1}$, $i_{fg2}$, $i_{fg3}$) for the purpose of forming the differential active power value ($P_{diff}$), and wherein the second summator is additionally supplied with at least one compensation harmonic reactive power value ($Q_h$) for the fundamental of the filter output currents ($i_{fg1}$, $i_{fg2}$, $i_{fg3}$) for the purpose of forming the differential reactive power value ($Q_{diff}$).

24. The apparatus as claimed in claim 23, wherein the control device (4) has a seventh computation unit for forming the compensation harmonic active power value ($P_h$) and the compensation harmonic reactive power value ($Q_h$) respectively from the α-component of the space vector transformation of the filter output currents ($i_{fg\alpha}$), from the β-component of the space vector transformation of the filter output currents ($i_{fg\beta}$), from the α-component of the space vector transformation of the filter output fluxes ($\psi_{L\alpha}$) from the β-component of the space vector transformation of the filter output fluxes ($\psi_{L\beta}$) and from the fundamental angle ($\omega t$) for the fundamental of the filter output currents ($i_{fg1}$, $i_{fg2}$, $i_{fg3}$).

* * * * *